United States Patent [19]

Tezuka

[11] Patent Number: 5,198,941

[45] Date of Patent: Mar. 30, 1993

[54] RECORDING OR REPRODUCING APPARATUS

[75] Inventor: Nobuo Tezuka, Kanagawa, Japan

[73] Assignee: Canon Kabushiki Kaisha, Tokyo, Japan

[21] Appl. No.: 831,077

[22] Filed: Feb. 5, 1992

Related U.S. Application Data

[63] Continuation of Ser. No. 662,319, Feb. 22, 1991, abandoned, which is a continuation of Ser. No. 544,047, Jun. 25, 1990, abandoned, which is a continuation of Ser. No. 314,248, Feb. 21, 1989, abandoned, which is a continuation of Ser. No. 843,740, Mar. 25, 1986, abandoned.

[30] Foreign Application Priority Data

Mar. 27, 1985 [JP] Japan .................. 60-062712

[51] Int. Cl.$^5$ ............................. H04N 5/781
[52] U.S. Cl. ................... 360/33.1; 358/906; 358/909; 360/99.03; 360/99.05; 360/105; 360/130.34
[58] Field of Search .............. 360/33.1, 99.01–99.03, 360/99.05, 99.12, 97.01, 105, 130.3, 130.34, 133, 35.1; 358/335, 906, 909

[56] References Cited

U.S. PATENT DOCUMENTS

| | | | |
|---|---|---|---|
| 4,074,330 | 2/1978 | Norton et al. | 360/99 X |
| 4,366,501 | 1/1982 | Tsunekawa et al. | 358/906 X |
| 4,437,132 | 3/1984 | Shimaoka | 360/99 X |
| 4,530,014 | 7/1985 | d'Alayer de Costemore d'Arc | 360/33.1 |
| 4,583,141 | 4/1986 | Shimaoka | 360/99 |
| 4,646,179 | 2/1987 | Nagashima et al. | 360/99 |
| 4,660,102 | 4/1987 | Kawakami et al. | 358/906 X |
| 4,661,871 | 4/1987 | Nagashima | 360/99 |
| 4,694,361 | 9/1987 | Tsuchiya et al. | 360/99 X |
| 4,694,363 | 9/1987 | Nakamori et al. | 360/99 |

*Primary Examiner*—W. R. Young
*Attorney, Agent, or Firm*—Robin, Blecker, Daley & Driscoll

[57] ABSTRACT

In a recording or reproducing apparatus of the kind recording or reproducing information on or from a disc-shaped magnetic sheet which is contained in a cassette, if the magnetic sheet is left over a long period of time in a stationary state in contact with a magnetic head on one side thereof with a stabilizer plate closely opposed thereto on the other side, the magnetic sheet tends to be locally deformed and, if the apparatus is portable, the magnetic head might be damaged by collision with the sheet as the sheet vibrates while the apparatus is carried around. The disclosed apparatus is provided with retracting means for retracting the magnetic sheet and the stabilizer plate away from the magnetic head while leaving the cassette unmoved, so that the possibility of having the magnetic sheet deformed and the magnetic head damaged by the vibration of the sheet while the apparatus is carried around can be eliminated with the magnetic sheet and the stabilizer plate retracted from the head.

24 Claims, 4 Drawing Sheets

RECORDING OR REPRODUCING APPARATUS

This is a continuation application under 37 CFR 1.62 of prior application Ser. No. 662,319, filed Feb. 22, 1991, which is a continuation application under 37 CFR 1.62 of prior application Ser. No. 544,047, filed Jun. 25, 1990, which is a continuation of application Ser. No. 314,248, filed on Feb. 21, 1989, which in turn is a continuation of application Ser. No. 843,740, filed on Mar. 25, 1986, all now abandoned.

BACKGROUND OF THE INVENTION

1. Field of the Invention

This invention relates to a recording or reproducing apparatus and more particularly to a recording or reproducing apparatus for recording or reproducing information on or from a disc-shaped magnetic sheet contained in a cassette.

2. Description of the Prior Art

There have been known various apparatuses of the kind arranged to record or reproduce information via a magnetic head on or from a disc-shaped rotary magnetic sheet which is contained in a cassette. The known apparatuses of this kind include an apparatus using a small flexible disc-shaped magnetic sheet measuring only 5 cm or thereabout in diameter. However, in recording (or reproducing) information in a high degree of density using the magnetic sheet of such a small diameter, it is necessary to arrange the so-called recording wave length to be considerably short and recording tracks to be formed at a short pitch. Particularly, in order to shorten the recording wave length, the recording speed of the magnetic sheet relative to the magnetic head, that is, the rotation velocity of the magnetic sheet must be increased. Further, the shortened recording wave length increases the adverse effect of the so-called spacing loss on the input and output values. Therefore, the magnetic sheet and the magnetic head must be arranged to come into stable contact with each other. The term "contact" as used here includes a case where an air stream forms an air film of thickness measuring submicron in between the magnetic sheet and the magnetic head.

Figure 4:
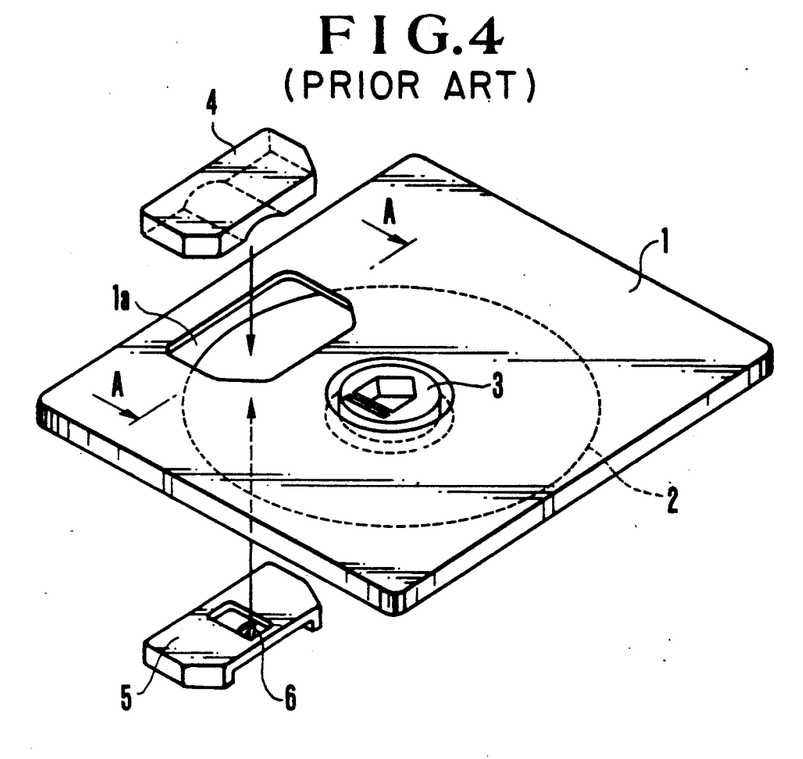
FIG. 4 is an exploded oblique view showing the essential parts related to this invention within the conventional recording or reproducing apparatus using a cassette type magnetic sheet.

For bringing the above-stated magnetic sheet of such a small diamter into stable contact with a magnetic head, there is known a method of using a stabilizer plate as shown in FIG. 4 of the accompanying drawing. FIG. 4 shows in an oblique view a stabilizer plate together with a cassette which contains a magnetic sheet therein. The magnetic sheet 2 is rotatably arranged within the cassette 1. To the middle part of the magnetic sheet 2 is secured a center core 3 which is arranged in one unified body with the sheet 2 to be fitted on a spindle (not shown) to have the sheet rotated by the spindle. The cassette 1 is provided with an aperture 1a for allowing the stabilizer plate 4 to be inserted therein. Another aperture is provided on the opposite side of the cassette 1 for allowing a restricting plate 5 and a magnetic head 6 to be insertable therethrough.

Figure 5:
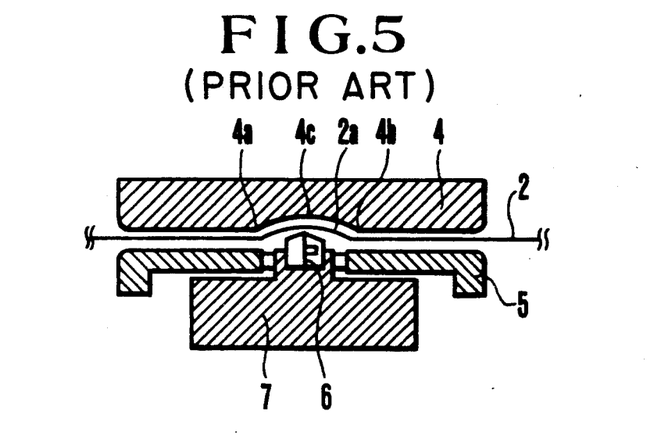
FIG. 5 is a sectional view taken along line A—A of FIG. 4.

FIG. 5 is a sectional view taken along line A—A of FIG. 4. Referring to FIG. 5, during the rotation of the magnetic sheet 2, the rotation causes the sheet 2 to be deformed along a recessed part 4c of the stabilizer plate 4; edges 4a and 4b of the recessed part 4c and the magnetic head 6. Further, the magnetic sheet 2 is prevented from vibrating by virtue of an air stream developed in between the stabilizer plate 4 and the magnetic sheet 2 while the latter is rotating. The restricting plate 5 is arranged only when necessary. However, the plate 5 is arranged to further stabilize the magnetic sheet 2 by having another air stream likewise developed between the sheet 2 and the plate 5. A head carriage 7 is arranged to carry the magnetic head 6 and to shift the head 6 in the radial direction of the magnetic sheet 2.

The arrangement shown in FIGS. 4 and 5 permits recording or reproduction in a fairly stable manner even in such a case where the diameter of the magnetic sheet is relatively small while that of the center core 3 is relatively large and the large diameter of the center core 3 tends to bring about an adverse effect on the deformation of the magnetic sheet 2.

Generally, the magnetic sheet 2 which is shown in FIGS. 4 and 5 is basically made of a flexible sheet material such as polyethyrene terephthalate (P.E.T.) or the like measuring scores of $\mu m$ in thickness. Therefore, with the stabilizer plate arranged in the manner as mentioned above, the deformation of the portion 2a of the magnetic sheet 2 confronting the magnetic head 6 would become permanent if the magnetic sheet 2 is left in repose after it has been stopped from rotating over a long period of time. This problem becomes serious especially in the case of such an apparatus as the so-called electronic camera that is to be used under saliently varying conditions or has the magnetic sheet 2 rotated only for a very short period or has the cassette 1 left in a loaded position within the apparatus over a long period of time.

Once such a deformation of the magnetic sheet 2 takes place, the contact of the sheet 2 with the magnetic head 6 becomes inadequate at the deformed part and parts before and after the deformed part. In such a case, recording or reproduction becomes partly impossible. In some cases, the deformed part causes vibrations of the magnetic sheet 2 to damage thereby the magnetic head 6. Further, in the case of an electronic camera or the like which is frequently carried around, vibrations are likely to be inflicted from outside of the camera. With the recording or reproducing apparatus arranged as shown in FIGS. 4 and 5, the external infliction of vibrations on the apparatus with the magnetic sheet 2 left loaded within the apparatus causes the magnetic sheet 2 to vibrate and, in some cases, causes also the stabilizer plate 4 to resonantly vibrate. In that event, the tip (the gap and a portion around the gap) of the magnetic head 6 might be cracked by the magnetic sheet 2. Then, the serviceable lives of the head and the sheet become shorter or, in some extreme cases, recording or repoduction becomes no longer possible. This problem cannot be solved by merely applying to the sheet confronting face of the stabilizer plate 4 some liner made of an unwoven cloth material such as rayon.

To prevent the above-stated accident, it has been proposed to have the magnetic head retracted from its magnetic sheet contacting position while recording or reproduction is not performed or while the magnetic sheet is not rotating. That arrangement prevents the magnetic sheet from being deformed. However, such arrangement has necessitated the use of a complex and high-precision head carrying device for retracting the magnetic head. In the event of a narrow track pitch or a short recording wave length in particular, some track deviation or azimuth deviation or the like might be caused by a deformation of a head carrying part resulting from the retraction of the magnetic head. Then, such deviation hinders the recording or reproducing operation.

SUMMARY OF THE INVENTION

This invention is directed to the solution of the above-stated problems of the prior art. It is therefore an object of this invention to provide a recording or reproducing apparatus wherein the local deformation of the magnetic sheet due to the head and the stabilizer plate can be effectively prevented even when the magnetic sheet and the cassette thereof are left loaded on the apparatus over a long period of time; the possibility of having the magnetic head damaged by the vibrations of the magnetic sheet which take place while the apparatus is carried around; the positional precision of the head is never deteriorated; and these advantages are attained without recourse to any complex structural arrangement.

In an embodiment of this invention, the above-stated problems are solved with retracting means arranged to retract the magnetic sheet and the stabilizer plate from the magnetic head while leaving the cassette unmoved. In other words, the magnetic head can be prevented from being damaged by the deformation and vibrations of the magnetic sheet with the magnetic sheet and the stabilizer plate retracted from the magnetic head by the above-stated retracting means.

The above and other related objects and features of this invention will become apparent from the following detailed description of preferred embodiments thereof taken in connection with the accompanying drawings.

DETAILED DESCRIPTION OF THE PREFERRED EMBODIMENTS

Figure 1:
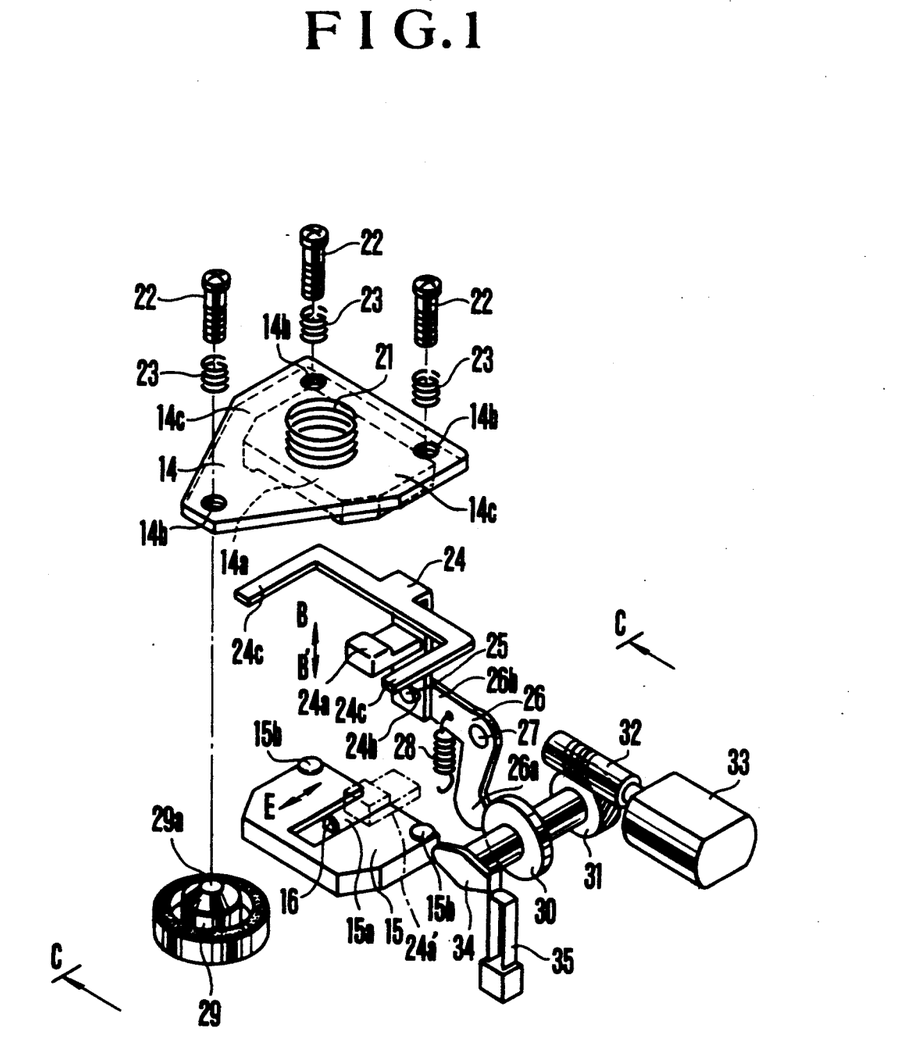
FIG. 1 is an oblique view showing the essential parts of a device arranged in an embodiment of this invention for retracting a stabilizer plate and a magnetic sheet.

In the following, some preferred embodiments are described with reference to the accompanying drawings: FIG. 1 shows the essential parts of a device arranged within an embodiment of this invention for retracting a stabilizer plate and a magnetic sheet. Referring to FIG. 1, a stabilizer plate 14 is provided with a lower protrudent part 14a which is arranged to perform the same function as the stabilizer plate 4 which is described in the foregoing with reference to FIGS. 4 and 5. A restricting plate 15 is also arranged to perform the same function as the restricting plate 5 of FIGS. 4 and 5. A magnetic head 16 is arranged to be shiftable by a shifting device which is not shown in the radial direction of a magnetic sheet, i.e. in the direction of arrow E. A spindle 29 is arranged to fittingly engage the center core 3 of the magnetic sheet 2 in the manner as described in the foregoing with reference to FIG. 4. A motor which is not shown is arranged to drive the spindle to rotate the magnetic sheet 2.

Figure 2A:
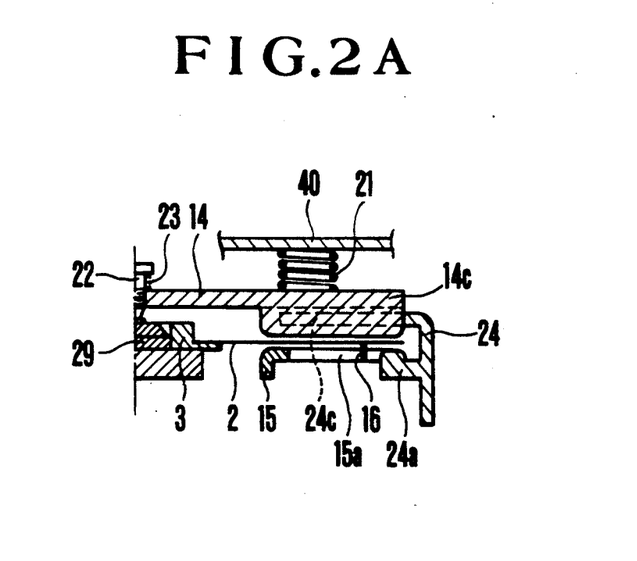
FIGS. 2A and 2B are sectional views taken along line C—C of FIG. 1 respectively showing various parts of FIG. 1 as in an uplifted state and as in a lowered state.
Figure 2B:
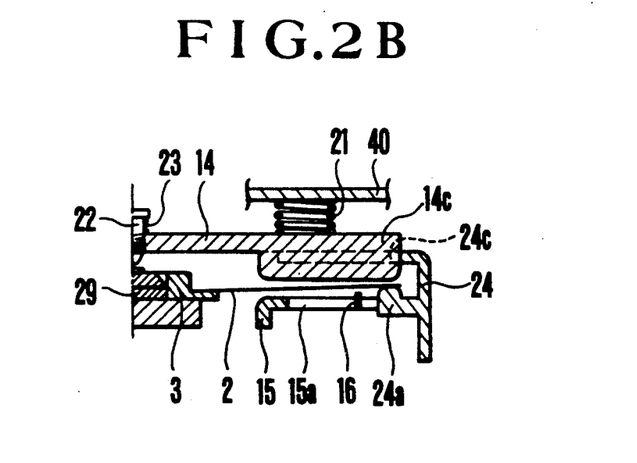

The stabilizer plate 14 is provided with a stepped part 14c which has three tap holes 14b. Height adjustment screws 22 are screwed into these tap holes 14b together with pressing springs 23. One of the fore ends of the height adjustment screws 22 abuts on the upper end face of the central shaft of the spindle 29 while other two are arranged to abut on screw receivers 15b which are provided on the restricting plate 15 respectively. The height of the protrudent part 14a of the stabilizer plate 14 is thus arranged to be adjustable relative to the magnetic sheet 2. A pressing spring 21 is arranged to push the stabilizer plate 14 toward the magnetic sheet 2 and is disposed in between the plate 14 and a cover 40 as shown in FIGS. 2A and 2B.

A lift member 24 which represents an example of means for retracting the magnetic sheet and the stabilizer plate is arranged to be shiftable up and down in the directions of arrows B and B'. The lift member 24 has two arm parts 24c formed on the upper side thereof. These arm parts 24c are opposed to the stepped part 14c of the stabilizer plate 14. Further, the member 24 is provided with a protrudent part 24a. The protrudent part 24a is arranged to come into the restricting plate 15 to have its upper face approximately flush with the sheet confronting face of the restricting plate 15 in its lowered position. The member 24 is thus arranged to cooperate with the restricting plate 15 when the magnetic sheet 2 rotates. A lever 26 is arranged to be turnable on a shaft 27 and is urged by a spring 28 to turn counterclockwise. A pin 25 is erected at one end 26b of the lever 26 and loosely engages a slot 24b which is provided in the lift member 24. The other end 26a of the lever 26 is caused by the spring 28 to abut on the peripheral cam face of a cam 30. A worm wheel 31 engages a worm gear 32 which is provided on the shaft of a motor 33. A phase detection cam 34 is arranged to control a phase detection switch 35. The cam 30, the worm wheel 31 and the phase detection cam 34 are formed in one unified body.

FIG. 1 shows this arrangement as having the lift member 24 uplifted (in the direction of arrow B) by the high lift part of the cam 30 via the lever 26. Under this condition, when the cam 30 is caused to turn round 180 degrees by the motor 33, the lift member 24 is shifted downward (in the direction of arrow B') by the low lift part of the cam 30 via the lever 26. When the motor 33 again causes the cam 30 to turn round 180 degrees, the high lift part of the cam 30 brings the lift member 24 back to the state as shown in FIG. 1.

With the lift member 24 in the state as shown in FIG. 1, the two arm parts 24c of the lift member 24 push upward the stepped part 14c of the stabilizer plate 14. This causes the stabilizer plate 14 to ascend against the urging force of the spring 21.

FIGS. 2A and 2B are sectional views taken along the line C—C of FIG. 1 showing respectively the lift member 24 as in its uplifted and lowered states.

Referring to FIG. 2A which shows the lift member 24 as in its lowered state, the arm parts 24c of the lift member 24 are not in contact with the stepped part 14c of the stabilizer plate 14 in this instance. Therefore, in relation to the restricting plate 15, the urging force of the pressing spring 21 brings the stabilizer plate 14 into a position defined by the height adjustment screws 22. Further, in this instance, the protrudent part 24a of the lift member 24 comes into an aperture 15a provided in the restricting plate 15 and thus acts on the magnetic sheet 2 as a part of the restricting plate 15.

Under the condition shown in FIG. 2A, the magnetic sheet 2 comes into contact with the magnetic head 16. Information is recorded or reproduced while the magnetic sheet rotates under that condition.

FIG. 2b shows the lift member 24 as in its uplifted position. Under this condition, the stepped part 14c of the stabilizer plate 14 is pushed upward by the arm parts 24c of the lift member 24 as mentioned above. Therefore, the stabilizer plate 14 comes to take the uplifted position thereof against the urging force of the pressing spring 21. In that instance, the protrudent part 24a of the lift member 24 also comes to ascend. Therefore, the protrudent part 24a brings the magnetic sheet 2 upward. The extent of the ascent of the magnetic sheet 2 to be thus caused by the protrudent part 24a is arranged to be such an extent that the magnetic head 16 never comes into contact with the magnetic sheet 2 even when the sheet 2 vibrates and that the stabilizer plate 14 never comes into contact with the magnetic sheet 2 as long as the magnetic sheet remains in a static state.

Under that condition, the magnetic sheet 2 is warped a little upward by the protrudent part 24a of the lift member 24. However, unlike in the case of the conventional arrangement shown in FIG. 5 and described in the foregoing, the magnetic sheet 2 remains unaffected by the stabilizer plate 14 and will never be permanently deformed even if it is left in that condition over a long period of time.

Further, even if vibrations are inflicted from outside of the apparatus under the condition of FIG. 2B, the magnetic head 16 would not be damaged by the vibrations of the magnetic sheet 2, because the magnetic sheet 2 never comes into contact with the magnetic head 16.

As mentioned in the foregoing with reference to FIG. 1, the condition of the embodiment shown in FIG. 2A and another condition shown in FIG. 2B alternately obtain according as the cam 30 repeatedly turns 180 degrees. Therefore, the positional relation between the magnetic sheet 2 and the stabilizer plate 14 and the positional relation between the sheet 2 and the magnetic head 16 can be obtained only when necessary by controlling the motor 33 in relation to a recording or reproducing operation. Therefore, the accidents mentioned in the foregoing can be effectively prevented.

Further, in the case of FIG. 1, the turning lever 26 is arranged to be driven by the motor 33. However, this arrangement may be replaced with some arrangement that permits a manual operation on the lever 26.

Figure 3:
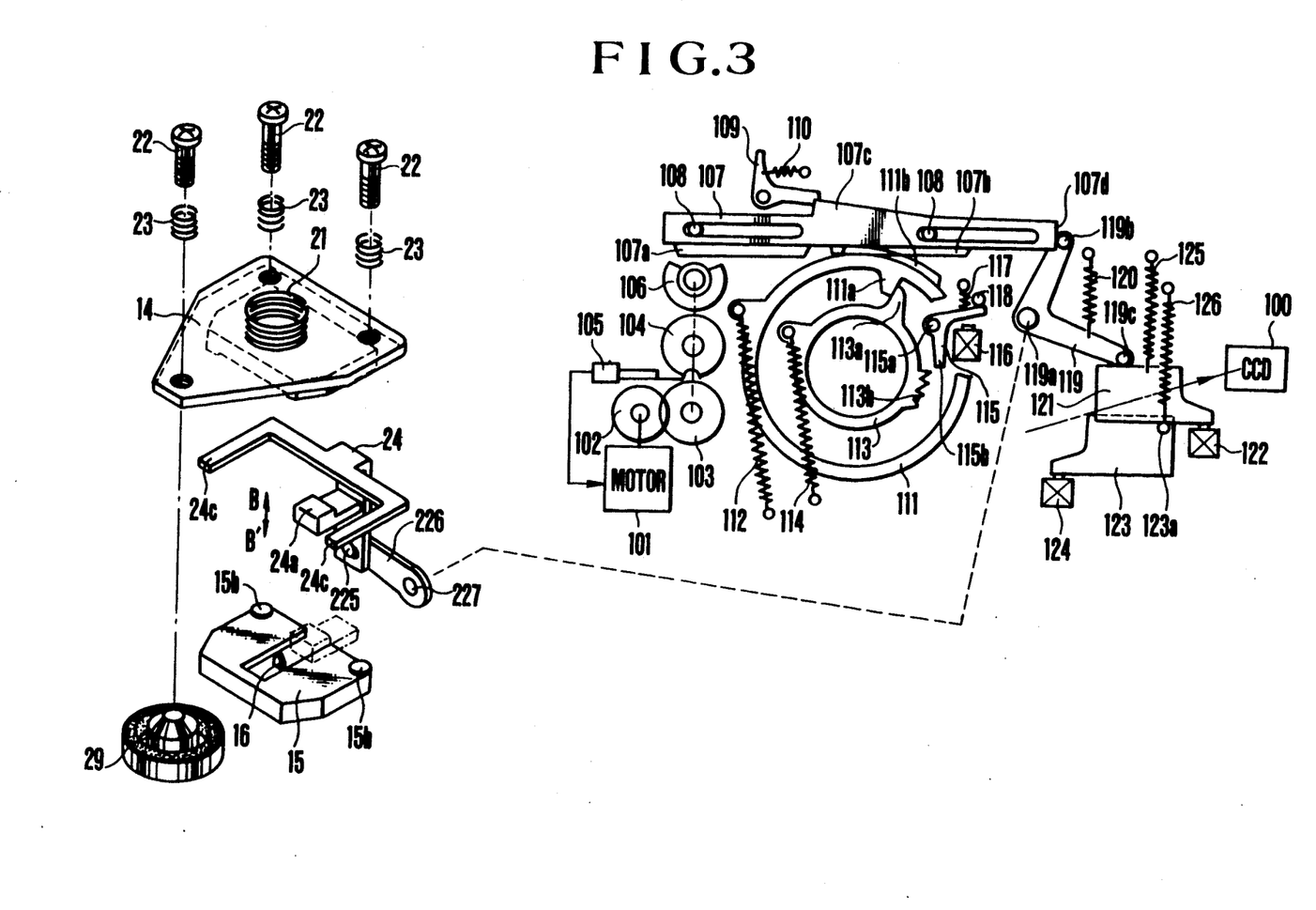
FIG. 3 is an illustration showing essential parts of an automatic focusing electronic camera to which this invention is applied as another embodiment thereof.

FIG. 3 shows a case where this invention is applied to an automatic focusing type electronic still picture camera. The electronic still picture camera is arranged, as well known, to form an image signal by image sensing means such as a CCD or the like; to perform a signal processing operation on the signal such as frequency modulation, etc.; and to record one TV field or one TV frame portion of the processed signal on a rotary magnetic sheet. In FIG. 3, members indicated by the same reference numerals as those used in FIGS. 1, 2, 4 and 5 are arranged and function in the same manner as the corresponding members shown in other drawings. The embodiment includes a turning lever 226, a shaft 227 and a pin 225 which respectively correspond to the lever 26, the shaft 27 and the pin 25 of FIG. 1. Referring to FIG. 3, a motor 101 is arranged to charge springs 112, 114, 125 and 126 which are serving as drive sources for a lens barrel and a shutter. The driving force of the motor 101 is transmitted via reduction gears 102 and 103 to a control cam 104 and a cut-out gear 106. A phase detection switch 105 is arranged to cut off power supply to the motor 101 when the control cam 104 and cut-out gear 106 which is in one unified body with the cam 104 is caused to make one turn by the motor 101. A slide lever 107 is arranged to be guided by shafts 108 and is provided with a rack part 107a which is arranged to engage the above-stated cut-out gear 106. Another rack part 107b of the slide lever 107 is arranged to engage the toothed part 111b of a lens barrel charge ring 111. The lens barrel charge ring 111 is urged to turn counterclockwise by a spring 112. The ring 111 is provided with a projection 111a which is arranged to urge the lens barrel 113. Further, this lens barrel charge ring 111 is rotatable round the optical axis of a photo-taking lens which is not shown. The lens barrel 113 is urged to rotate counterclockwise by a spring 114 and is provided with a projection 113a which is arranged to engage the projection 111a of the lens barrel charge ring 111. The lens barrel 113 is provided further with a claw part 113b which is arranged to be locked by a locking member when an in-focus state is attained. The photo-taking lens which is not shown is arranged to shift its position in the direction of the optical axis according as the lens barrel 113 turns round and to form an image of an object on the image sensing plane of an image sensor 100 which is a CCD or the like.

The locking member 115 is turnable on a shaft 115a and is urged to turn counterclockwise on the shaft 115a by a spring 117. When an in-focus signal is produced from a known focus detecting device which is not shown, an electromagnet 116 is energized to attract and cause the locking member 115 to turn clockwise. Then, the fore end part 115b of the member 115 comes to engage the claw part 113b of the lens barrel 113. The counterclockwise rotation of the lens barrel caused by the spring 114 is brought to a stop by this engagement.

A shutter charge lever 119 is urged to turn counterclockwise on a shaft 119a by a spring 120. A pin 119b which is erected at one end of the lever 119 is arranged to engage one end 107d of the above-stated slide lever 107. Another pin 119c which is provided at the other end of the shutter charge lever 119 is arranged to abut on a leading shutter blade 121. The above-stated turning lever 226 is interlocked with the shutter charge lever 119. When the lever 119 turns clockwise, the lever 226 also turns clockwise. The latter turns counterclockwise when the former turns counterclockwise. Leading and trailing shutter blades 121 and 123 are urged to move upward as viewed on the drawing respectively by springs 125 and 126. Electromagnets 122 and 124 are arranged to control the shutter blades 121 and 123 and to be energized under the control of a known shutter control circuit which is not shown. A clamp lever 109 is arranged to engage the hook part 107c of the above-stated slide lever 107. A spring 110 is arranged to urge the clamp lever 109.

The embodiment which is arranged in this manner operates as follows: FIG. 3 shows the embodiment as in a state of having completed a shutter charging process. Under this condition, the turning lever 226 is in a state of having turned clockwise following the clockwise turn of the charge lever 119. The lift member 24 is in its uplifted position as shown in FIG. 2B. The sheet 2 and the stabilizer plate 14 have been retracted away from the head 16. When a release operation is performed on the camera under this condition, a sheet rotating motor which is not shown begins to rotate. The spindle 29 also begins to rotate. The electromagnets 122 and 124 are energized respectively.

Then, when the slide lever 107 is unlocked with the clamp lever 109 turned round against the force of the spring 110 by the release operation, the urging force of the spring 112 causes the lens barrel charge ring 111 to rotate counterclockwise. The slide lever 107 then moves to the left. Concurrently with this, the spring 120 causes the shutter charge lever 119 to turn counterclockwise. The leading shutter blade 121 is released from the pushing action of the pin 119c of the lever 119. Therefore, the shutter blades 121 and 123 come to be held by the electromagnets 122 and 124 respectively. Further, at the same time, the counterclockwise turn of the lever 119 causes the turning lever 226 also to turn counterclockwise. This causes the lift member 24 to descend to bring the magnetic sheet 2 into contact with the magnetic head 16 as shown in FIG. 2A. Meanwhile, the stabilizer plate 14 also descends to a prescribed position.

Meanwhile, the spring 114 causes the lens barrel 113 to rotate counterclockwise. The rotation of the lens barrel is brought to a stop at an in-focus position of the photo-taking lens by means of the locking member 115 as mentioned above. The photo-taking lens is thus controlled to come into its in-focus position.

Then, when a power supply to the electromagnet 122 which holds the leading shutter blade 121 is cut off in synchronism with the timing of a driving operation on the image sensor 100, the leading shutter blade 121 is caused to travel by the force of the spring 125. Following this, when a power supply to the electromagnet 124 which holds the trailing shutter blade 123 is cut off after the lapse of a predetermined period of time, the trailing shutter blade is caused to travel by the spring 126. By this, an aperture which is provided there is closed to bring an exposure operation on the image sensor 100 to an end. After that, either one field or one frame portion of a record is recorded on the magnetic sheet 2. Upon completion of recording, the head 16 is shifted to a next recording position. In shifting the head, a power supply is effected to the motor 101. The motor 101 then causes the slide lever 107 to move to the right via the gears 102, 103 and 106. The shutter charging lever 119 is caused to turn clockwise to bring the shutter blades 121 and 123 back to their positions as shown in FIG. 3. Further, the clockwise turn of the lever 119 causes the turning lever 226 to turn also clockwise. Accordingly, the lift member 24 is uplifted to a position as shown in FIG. 2B. The sheet 2 and the stabilizer plate 14 are thus retracted away from the head 16. Upon completion of a shutter charging process, the slide lever 107 is locked with the clamp lever 109 coming to engage the hook part 107c of the lever 107. At this point of time, the rotation of the motor 101 comes to a stop with the switch 105 turned off by the cam 104.

In the embodiment shown in FIG. 3, the shutter is of a slit type consisting of two blades. However, the shutter of course may be replaced with a so-called diaphragm type shutter.

In the electronic camera described by way of example above, the stabilizer plate 14 and the magnetic sheet 2 are arranged to be moved away from the magnetic head 16 with the retracting arrangement interlocked with the automatic focusing device of the camera. However, in the case of a single-lens reflex type electronic camera, the retracting arrangement may be interlocked, for example, with the quick return mirror mechanism of the camera.

With the invention applied to an electronic camera in the manner as described above, the operation of the invented arrangement described is performed only at the time of recording in association with the exposure effecting arrangement of the camera. Therefore, in accordance with the invention, the reliability of sequential processes can be enhanced and the structural arrangement can be simplified to permit reduction in size of the apparatus.

The invented arrangement to have the stabilizer plate and the magnetic sheet kept away from the magnetic head except when they are to be used for in recording or reproduction, etc. Therefore, such accidents as the deformation of the magnetic sheet, having the magnetic head damaged, etc. can be effectively prevented. It is another advantage of the invention that the magnetic head is not retracted for prevention of such accidents so that the positional precision of the head can be saved from deteriorating and the required structural arrangement can be saved from becoming complex.

What is claimed is:

1. A recording or reproducing apparatus using a disc-shaped magnetic sheet which is contained within a cassette for recording or reproducing information thereon, comprising:

a recording or reproducing magnetic head;

a stabilizer member closely opposed to said magnetic head via said magnetic sheet for stabilizing said magnetic sheet at said magnetic head;

a lifting member having first and second lifting portions, said first lifting portion lifting up said stabilizer member away from said magnetic sheet and said magnetic head, said second lifting portion lifting up said magnetic sheet away from said magnetic head; and control means for moving said lifting member, said control means being capable of holding said lifting member in a position where said magnetic sheet and said stabilizer member separate from said magnetic head to prevent said magnetic sheet from contacting with said magnetic head.

2. An apparatus according to claim 1, wherein said control means includes an operation member which permits a manual operation thereof.

3. An apparatus according to claim 1, wherein said recording or reproducing head is arranged to record or reproduce a signal comprising a video signal.

4. An apparatus according to claim 1, wherein said control means includes a motor.

5. An apparatus according to claim 1 in which the control means has at least two control modes, the apparatus further comprising:

a video signal source which operates to supply said head with a video signal; and change-over means for changing operation of said control means from a first control mode thereof to another mode thereof in correspondence to change in operation of said video signal source.

6. An apparatus according to claim 5, wherein said video signal source includes image sensing means which converts an optical image into an electrical signal.

7. An apparatus according to claim 5, wherein said video signal source is arranged to assume a first state before a video signal is produced and a second state in which said video signal is produced; and said control means is arranged to control movement of said magnetic sheet or said stabilizer member respectively toward or away from the magnetic head when said video signal source is in second or first states thereof, respectively.

8. A recording or reproducing apparatus, comprising:
   a) head means for recording or reproducing a signal on or from a sheet-shaped recording medium;
   b) stabilizing means, disposed in close relation to a surface of said recording medium, for stabilizing a state of contact of said head means with said recording medium;
   c) first control means operable to separate said recording medium and said head means from each other and prevent said recording medium from moving into contact with said head means in a state where said recording medium is loaded in a predetermined loading position and to hold them in separated state and to lift up a part of the medium opposite said stabilizing means; and
   d) second control mean separable, in association with said first control means, to separate said stabilizing means from said head means and said recording medium in a state where said recording medium is in said loading position and to hold said stabilizing means and said recording medium in separate state from each other.

9. An apparatus according to claim 8, wherein said first control means is arranged to have at least two different control modes including:
   i) a first mode in which said recording medium is brought into contact with said head means; and
   ii) a second mode in which said recording medium is moved away from said head means.

10. An apparatus according to claim 9, further comprising:
   input means for supplying a recording signal to said head means; and
   means for varying a control mode of said first control means according to a predetermined operating condition of said input means.

11. An apparatus according to claim 8, wherein said stabilizing means is arranged to stabilize the relation between said recording medium and said head means.

12. A recording or reproducing apparatus, comprising:
   a) head means for recording or reproducing a signal on or from a sheet-shaped recording medium;
   b) a stabilizing member disposed in close relation to a surface of said recording medium, for stabilizing a state of contact of said head means with said recording medium;
   c) first control means for separating said stabilizing member and said head means from each other in a state where said recording medium is loaded in a predetermined loading position on said apparatus; and
   d) second control mean separable, in association with said first control means in the state where said recording medium is in said loading position, to separate said recording medium and said head means from each other and to hold said stabilizing means and said recording medium in separated state from each other, said control means being operable to inhibit movement of said recording medium toward said head means to prevent said recording medium from moving into contact with said head means and to lift up a part of the medium opposite said stabilizing member.

13. A recording or reproducing apparatus comprising:
   a) head means for recording or reproducing a signal on or from a sheet-shaped recording medium;
   b) instruction means for giving an instruction to cause said head to record a predetermined signal on said recording medium, said instruction means being arranged to assume a first instructing state and a second instructing state, said second instructing state being arranged to succeed said first instructing state; and
   c) control means arranged to have said recording medium separated to a relatively great extent from said head means before said first instructing state exists and, after said first instructing state, to have said recording medium brought closer to said head means to enable said head means to perform recording or reproduction before said second instructing state exists, said control means being arranged to supply said head means with a recording signal while said second instructing state exists.

14. An electronic camera for recording a photographed image information on a disc-shaped magnetic sheet, comprising:
   a) image pickup means for photoelectrically converting an incident image to output an image pickup signal;
   b) focus control means for controlling the operation of a focus adjusting means, which is arranged to focus an incident light on said image pickup means;
   c) a recording head for recording the image pickup signal outputted from said image pickup means onto said magnetic sheet;
   d) stabilizer means, disposed inc lose relation to said magnetic sheet, for stabilizing a state of contact of said recording head with said magnetic sheet; and
   e) control means arranged in association with controlling operation of said focus control means, to move said stabilizer means and said magnetic sheet to positions close to said recording head according to completion of the focus adjusting operation of said focus control means.

15. An electronic camera according to claim 14, wherein said focus adjusting means includes a focusing lens, and said focus control means is arranged to automatically adjust said focusing lens to its in-focus position.

16. An electronic camera according to claim 15, wherein said control means is arranged to move said stabilizer means and said magnetic sheet before feeding the image information into said pickup means.

17. A recording or reproducing apparatus using a disc shaped magnetic sheet which is contained within a cassette for recording or reproducing information thereon, comprising:
   a recording or reproducing magnetic head;
   a stabilizer member, disposed in close relation to a surface of said magnetic sheet, for stabilizing a state of contact of said head with said magnetic sheet;
   a lifting member having first and second lifting portions, said first lifting portion lifting up said stabilizer member away from said magnetic sheet and said magnetic head, said second lifting portion lifting up said magnetic sheet away from said magnetic head; and control means being capable of holding said lifting member in a position where said magnetic sheet and said stabilizer member separate from said magnetic head and inhibiting movement of said magnetic sheet toward said magnetic head.

18. An apparatus according to claim 17, wherein said control means includes an operation member which permits a manual operation thereof.

19. An apparatus according to claim 17, wherein said control means includes an operation mode in which both said magnetic sheet and said stabilizer member are moved away from said magnetic head with said cassette left in a loaded state.

20. An apparatus according to claim 17, wherein said recording or reproducing head is arranged to record or reproduce a signal comprising a video signal.

21. An apparatus according to claim 17, wherein said control means includes a motor.

22. An apparatus according to claim 17, in which the control means has at least two control modes, the apparatus further comprising:
a video signal source which operates to supply said head with a video signal; and
change-over means for changing operation of said control means from a first control mode thereof to another mode thereof in correspondence to change in operation of said video signal source.

23. An apparatus according to claim 22, wherein said video signal source includes image sensing means which converts an optical image into an electrical signal.

24. An apparatus according to claim 22, wherein said video signal source is arranged to assume a first state before a video signal is produced and a second state in which said video signal is produced; and said control means is arranged to control movement of said magnetic sheet or said stabilizer member respectively toward or away from the magnetic head when said video signal source is in second or first states thereof, respectively.

* * * * *

UNITED STATES PATENT AND TRADEMARK OFFICE
CERTIFICATE OF CORRECTION

PATENT NO. : 5,198,941
DATED : March 30, 1993
INVENTOR(S) : Nobuo Tezuka

It is certified that error appears in the above-identified patent and that said Letters Patent is hereby corrected as shown below:

| | |
|---|---|
| Col. 1, line 46 | Change "diamter " to -- diameter -- |
| Col. 2, line 47 | Change "resonantly vibrate" to -- vibrate resonantly -- |
| Col. 4, line 8 | After "while" insert -- the -- |
| Col. 4, lines 45, 49 | Change "round" to -- around -- |
| Col. 6, line 26 | Change "according" to -- accordingly -- |
| Col. 6, line 27 | Change "round" to -- around -- |
| Col. 7, line 6 | Change "round" to -- around -- |
| Col. 8, line 15 | Delete "in" |
| Col. 9 line 36 | Change "claim 9" to -- claim 8 -- |
| Col. 9, line 59 | Change "separable" to -- operable -- |

UNITED STATES PATENT AND TRADEMARK OFFICE
CERTIFICATE OF CORRECTION

PATENT NO. : 5,198,941
DATED : March 30, 1993
INVENTOR(S) : Nobuo Tezuka

It is certified that error appears in the above-indentified patent and that said Letters Patent is hereby corrected as shown below:

Col. 10, line 37   Change "inc lose" to -- in close --

Signed and Sealed this

Eleventh Day of January, 1994

Attest:

BRUCE LEHMAN

Attesting Officer   Commissioner of Patents and Trademarks